US007008186B2

(12) United States Patent
Heeg et al.

(10) Patent No.: US 7,008,186 B2
(45) Date of Patent: Mar. 7, 2006

(54) TEARDROP FILM COOLED BLADE

(75) Inventors: Robert John Heeg, Cincinnati, OH (US); Brian Alan Norton, Blue Ash, OH (US); Scott Joseph Schmid, Cincinnati, OH (US); Ganesh Nagab Kumar, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 240 days.

(21) Appl. No.: 10/664,649

(22) Filed: Sep. 17, 2003

(65) Prior Publication Data

US 2005/0232768 A1 Oct. 20, 2005

(51) Int. Cl.
*F01D 5/18* (2006.01)

(52) U.S. Cl. .................................... 416/97 R; 415/115

(58) Field of Classification Search ............. 416/97 R, 416/115, 96 A, 96 R, 92

See application file for complete search history.

(56) References Cited

U.S. PATENT DOCUMENTS 4,197,443 A 4/1980 Sidenstick
4,653,983 A 3/1987 Vehr
4,664,597 A 5/1987 Auxier et al.
4,672,727 A 6/1987 Field
4,738,588 A 4/1988 Field
4,762,464 A 8/1988 Vertz et al.
5,368,441 A * 11/1994 Sylvestro et al. ......... 416/97 R
6,206,638 B1 * 3/2001 Glynn et al. .............. 416/97 R
6,554,572 B1 * 4/2003 Rinck et al. .............. 416/97 R

OTHER PUBLICATIONS

GE Aircraft Engines, Turbine Blade A, in public use more than one year before Aug. 1, 2003, one page.
GE Aircraft Engines, Turbine Blade B in public use more than one year before Aug. 1, 2003, one page.
GE Aircraft Engines, Turbine Blade C, in public use more than one year before Aug. 1, 2003, two pages.
GE Aircraft Engines, Turbine Blade D, on sale more than one year before Aug. 1, 2003, one page.

* cited by examiner

*Primary Examiner*—Edward K. Look
*Assistant Examiner*—Devin Hanan
(74) *Attorney, Agent, or Firm*—William S. Andes; Francis L. Conte

(57) ABSTRACT

A turbine blade includes an airfoil having an internal cooling circuit with a first flow passage disposed directly behind the leading edge followed by a second flow passage separated therefrom by a corresponding bridge. The bridge includes a row of impingement apertures for cooling the leading edge. The suction sidewall of the airfoil includes a row of diffusion film cooling first holes extending in flow communication with the first passage. The first holes have a compound inclination angle, with a quadrilateral cross section forming a generally teardrop shaped outlet in the convex contour of the suction sidewall.

27 Claims, 4 Drawing Sheets

TEARDROP FILM COOLED BLADE

BACKGROUND OF THE INVENTION

The present invention relates generally to gas turbine engines, and, more specifically, to turbine rotor blades therein.

In a gas turbine engine air is pressurized in a compressor and mixed with fuel in a combustor for generating hot combustion gases. Energy is extracted from the gases in a high pressure turbine which powers the compressor. Additional energy is extracted from the gases in a low pressure turbine which powers a fan in a typical aircraft turbofan gas turbine engine application.

Engine efficiency increases as combustion gas temperature increases, but the gas temperature must be limited for protecting the various components over which the combustion gases flow during operation. For example, the combustion gases are initially confined by the liners of the combustor and channeled between the stator vanes of the turbine nozzle bounded by inner and outer bands. The combustion gases flow between the turbine rotor blades and are bound by radially inner platforms integral therewith and radially outer turbine shrouds surrounding the row of rotor blades.

Each component of the engine is specifically designed with a specific configuration for its specific purpose associated with the hot combustion gases. The hot engine components directly exposed to the hot combustion gases are typically cooled by using a portion of the pressurized air diverted from the compressor which is channeled through corresponding cooling circuits of the components.

The variety of cooling circuits and features thereof is remarkably large due to the associated problems in cooling the variously configured components. Turbine component life is typically limited by local affects, and therefore each component must be specifically designed in toto for protection from the hot combustion gases while maintaining suitable strength of the component for the desired useful life of the component.

Component life is a significant factor in designing modern aircraft turbofan engines which directly affects acquisition and maintenance costs of thereof. Accordingly, state-of-the-art high strength superalloy materials are commonly used in the design of modern aircraft engines, notwithstanding their correspondingly high cost. Superalloy materials, such as nickel or cobalt based superalloys, maintain high strength at high temperature and are desirable in the manufacture of the various hot components of the engine.

In a typical high pressure, first stage turbine rotor blade, the superalloy material thereof is typically enhanced by coating the exposed, external surface of the blade with a thermal barrier coating (TBC). Such coatings are typically ceramic materials which have enhanced thermal insulating performance for protecting the superalloy metallic substrates of the hot components, such as the turbine blade.

The blade includes suitable internal cooling circuits through which the compressor air coolant is channeled for maintaining the operating temperature of the blade below a desired limit for ensuring the intended life for the blade. The blade cooling circuits are myriad in view of the complexity of the airfoil thereof and the corresponding complex temperature distribution of the combustion gases which flow thereover during operation.

Internal cooling circuits typically include dedicated circuits for the leading edge region of the airfoil, the trailing edge region of the airfoil, the mid-chord region of the airfoil, as well as the radially outer tip portion of the airfoil which defines a relatively small clearance or gap with the surrounding turbine shroud. Internal cooling of the airfoil is complemented by external cooling of the airfoil provided by various holes or apertures which extend through the pressure or suction sidewalls, or both, of the airfoil.

The airfoil sidewalls typically include inclined film cooling apertures extending therethrough which discharge the spent cooling air in thin films along the external surface of the airfoil for providing an additional thermal insulating barrier between the airfoil and the hot combustion gases. The variety of film cooling holes themselves is also myriad in view of the complexity of the combustion flowstream surrounding the airfoil. A suitable pressure drop must be provided at each of the film cooling holes to provide a corresponding backflow margin for the holes, as well as discharging the film cooling air without excessive velocity which could lead to undesirable blowoff.

Since the various portions of the airfoil have different operating environments in the combustion gas flow field, they require different cooling configurations. The cooling configurations for the leading edge of the airfoil therefore is not appropriate for the cooling configuration for the trailing edge of the airfoil, and vice versa. Furthermore, the generally concave pressure side of the airfoil operates differently than the generally convex suction side of the airfoil, and correspondingly require different cooling configurations.

And, the radially outer tip of the airfoil typically includes small squealer ribs extending outwardly from the perimeter of the tip which define a small tip cavity above a solid floor of the tip. The combustion gases necessarily leak over the airfoil tip in the clearance provided with the turbine shroud and therefore subject the small squealer ribs to hot combustion gases on both sides thereof. Accordingly, tip cooling requires special configurations, which again are found with myriad differences in conventional applications.

One exemplary gas turbine engine has enjoyed many, many years of successful commercial operation in a marine application. Marine and industrial gas turbine engines are typically derived from their previous turbofan aircraft gas turbine engine parents, and are modified for use in the non-aircraft configurations. These various gas turbine engines nevertheless share common core engines including the compressor, combustor, and high pressure turbine, notwithstanding their different low pressure turbine configuration for providing output power for the fan in the turbofan application or drive shafts in marine and industrial applications.

Although the exemplary marine engine disclosed above has enjoyed many, many thousands of hours of successful commercial use, that long experience has uncovered a form of thermally induced distress in the high pressure, first stage turbine rotor blades nearing the end of their useful lives. In particular, both the blade tip, and the mid-span region of the blade on the suction sidewall just aft of the blade leading edge are showing thermal distress which leads to the degradation of the thermal barrier coating.

Accordingly, it is desired to provide a turbine rotor blade having improved cooling for specifically addressing the newly uncovered local distress in high-time rotor blades.

BRIEF DESCRIPTION OF THE INVENTION

A turbine blade includes an airfoil having an internal cooling circuit with a first flow passage disposed directly behind the leading edge followed by a second flow passage separated therefrom by a corresponding bridge. The bridge includes a row of impingement apertures for cooling the leading edge. The suction sidewall of the airfoil includes a row of diffusion film cooling first holes extending in flow communication with the first passage. The first holes have a compound inclination angle, with a quadrilateral cross section forming a generally teardrop shaped outlet in the convex contour of the suction sidewall.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
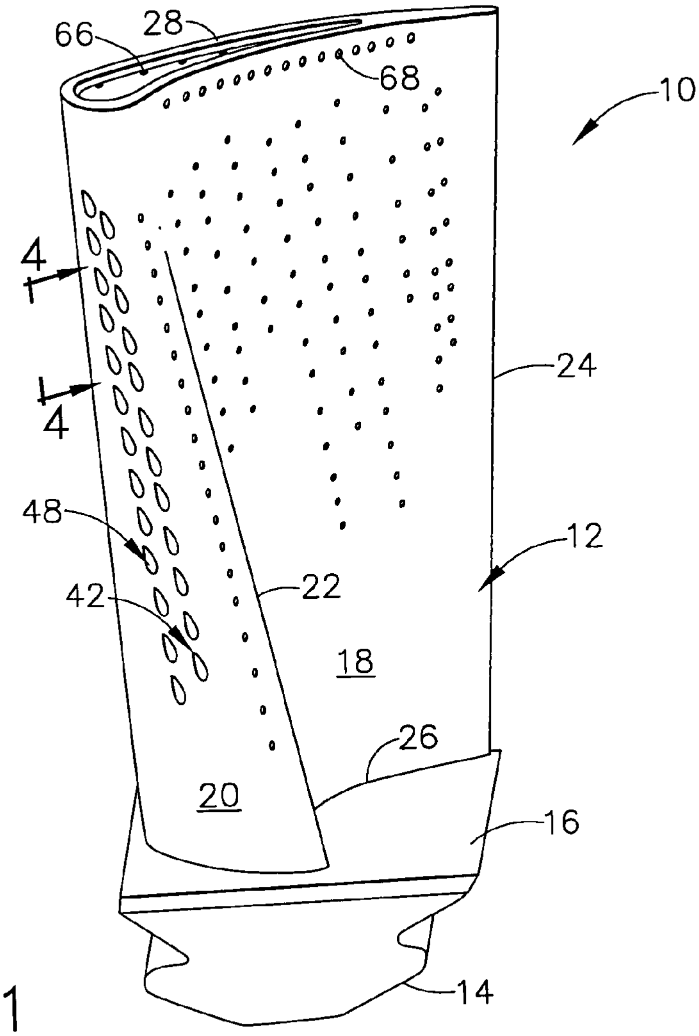
FIG. 1 is an isometric view of an exemplary first stage turbine rotor blade.

Illustrated in FIG. 1 is an exemplary turbine rotor blade 10 for a gas turbine engine which may have any conventional configuration such as a turbofan aircraft engine, a marine turbine engine, or an industrial turbine engine. The blade includes a hollow airfoil 12 integrally joined to a supporting dovetail 14 at a platform 16 therebetween. The dovetail may have any conventional configuration and is used for mounting the blade in a corresponding slot in the perimeter of a turbine rotor disk which drives a multistage axial compressor (not shown).

The airfoil includes a generally concave, pressure or first sidewall 18 and an opposite, generally convex suction or second sidewall 20. The two sidewalls extend chordally between axially opposite leading and trailing edges 22,24 which extend in longitudinal or radial span from a radially inner root 26 at the platform 16 to a radially outer tip 28 typically disposed closely below a surrounding turbine shroud (not shown).

Figure 3:
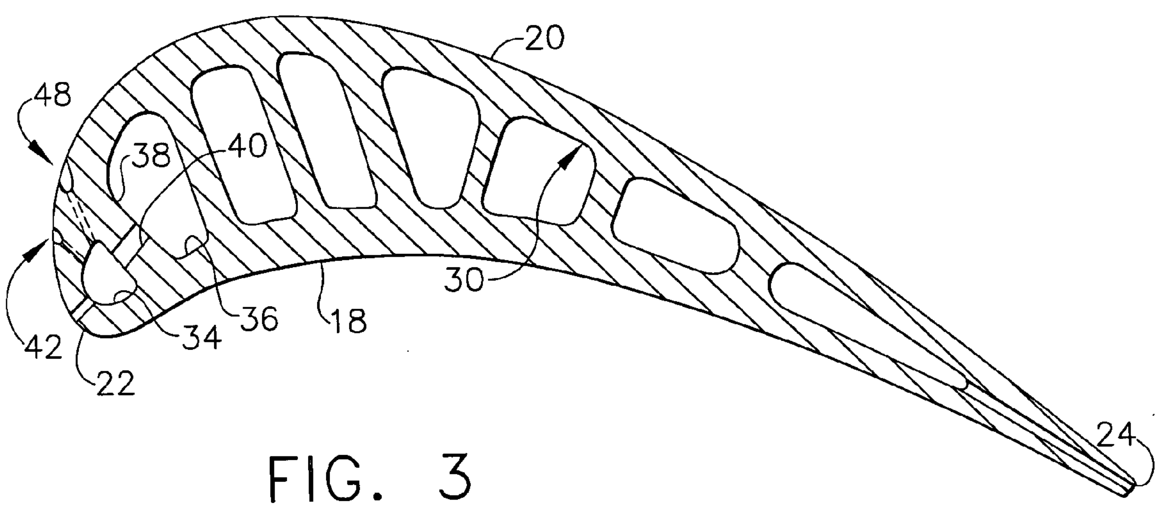
FIG. 3 is a radial sectional view through the airfoil illustrated in FIG. 2, and taken along line 3—3.
Figure 2:
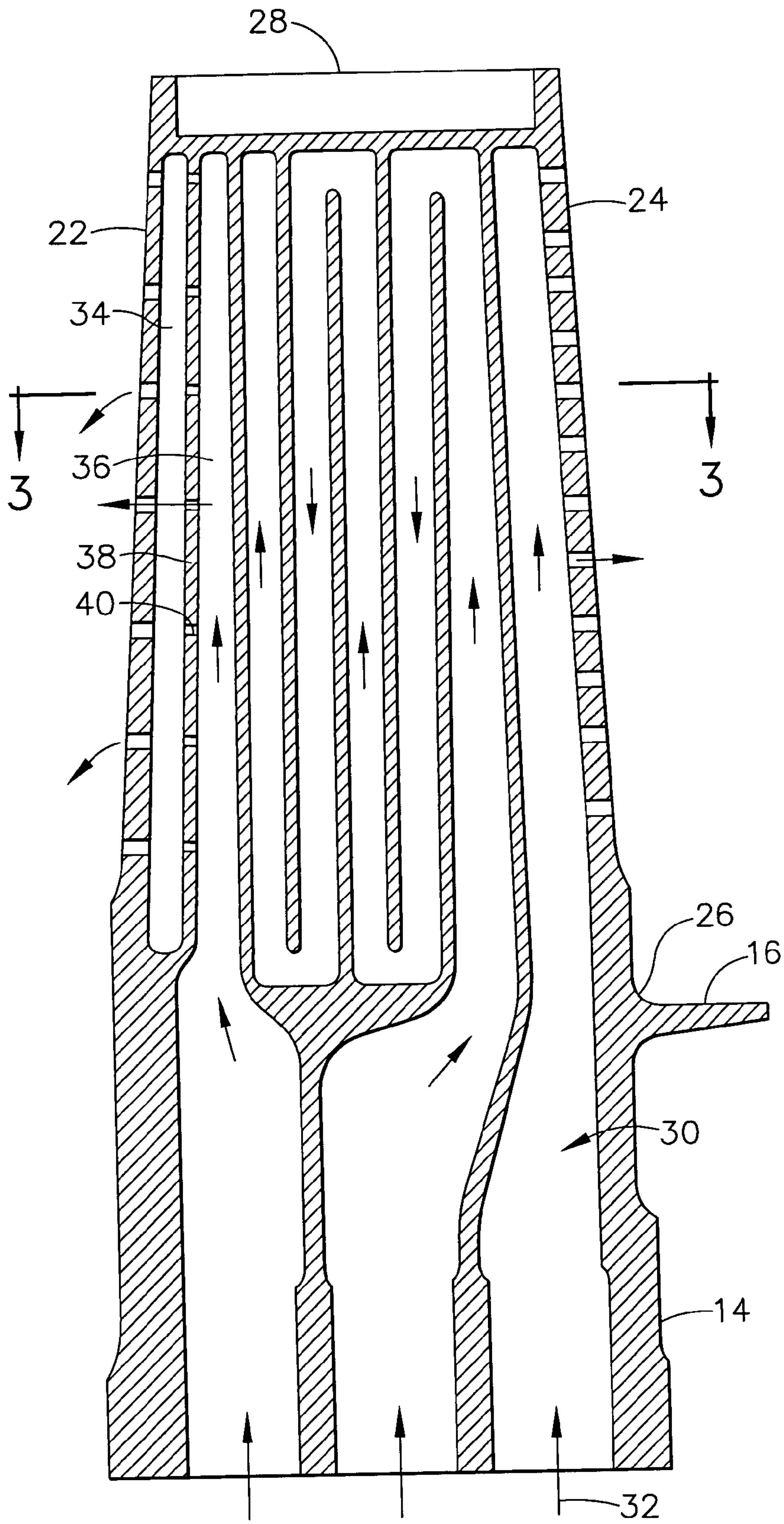
FIG. 2 is an axial sectional view of the airfoil illustrated in FIG. 1 showing an internal cooling circuit therein.

As illustrated in FIGS. 2 and 3, the blade also includes an internal cooling circuit 30 which extends through the dovetail and airfoil for channeling therethrough a portion of pressurized compressor air or coolant 32 diverted from the compressor during operation. The cooling circuit may have any conventional configuration, and in the preferred embodiment illustrated in FIGS. 2 and 3 includes a first or leading edge flow passage 34 disposed directly behind the airfoil leading edge 22.

The first passage is followed in turn by a second flow passage 36 separated therefrom by a first bridge 38 integrally joined to the pressure and suction sidewalls. The two passages 34,36 extend the full radial span of the airfoil, with the second passage 36 continuing radially inwardly through the dovetail for providing an inlet in which a portion of the coolant 32 is received.

In the exemplary configuration illustrated in FIGS. 2 and 3, the cooling circuit 30 further includes a dedicated trailing edge cooling passage having a separate inlet in the dovetail, and corresponding row of trailing edge outlet holes. A five-pass serpentine flow channel is disposed between the trailing edge passage and the second flow passage 36, with a third dedicated inlet in the dovetail. The first and second passages 34,36 cooperate to provide dedicated cooling of the leading edge, which complements the mid-chord and trailing edge cooling configurations of the circuit 30.

Figure 4:
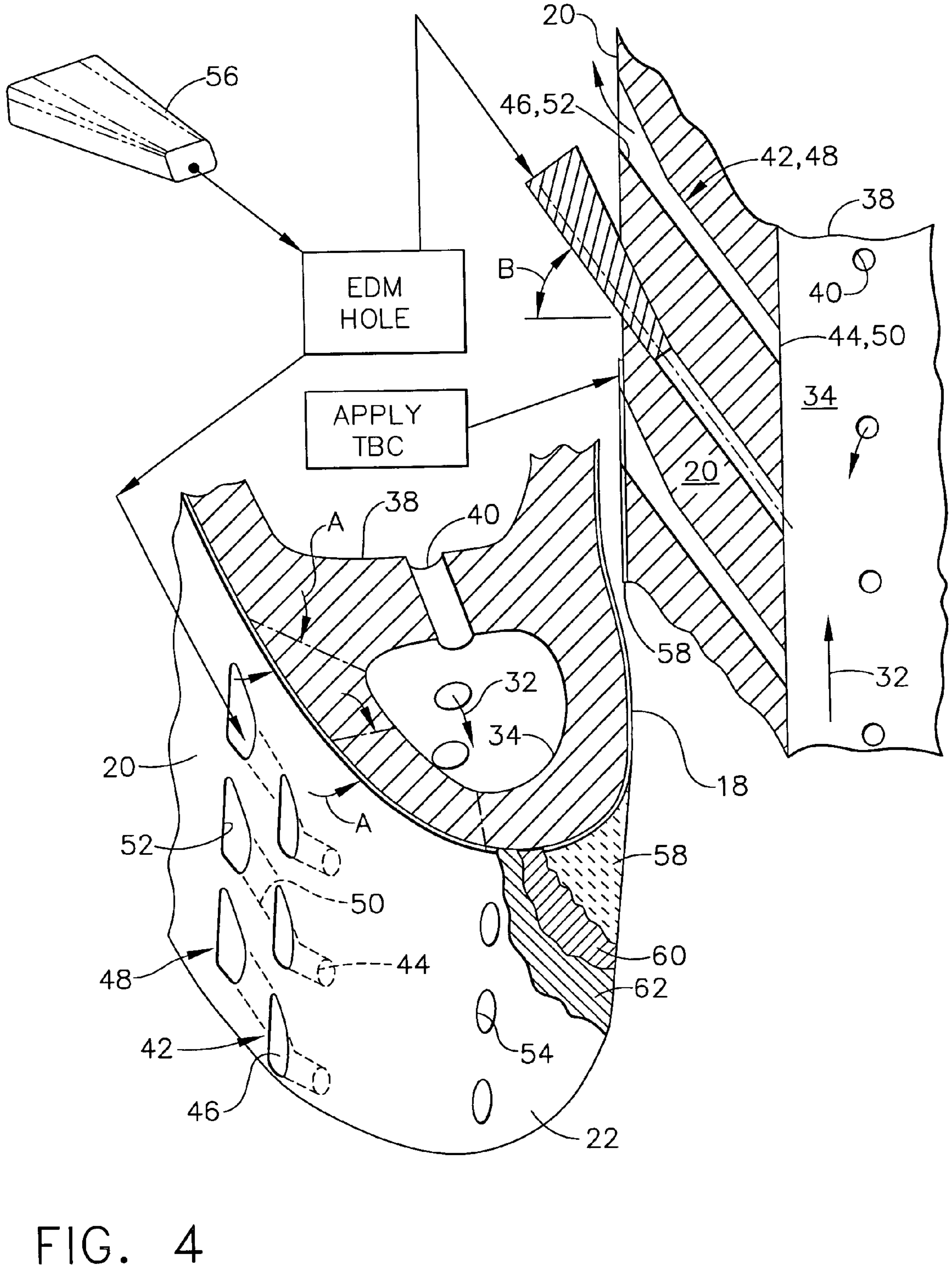
FIG. 4 is a flowchart representation of an exemplary method of forming the specifically configured diffusion film cooling holes in the blade illustrated in FIGS. 1–3.

As shown in FIGS. 3 and 4, the bridge 38 includes a row of impingement apertures 40 for discharging the coolant from the second passage 36 into the first passage 34 in impingement behind the leading edge 22. In this way, the coolant directly impinges the inside surface of the first channel 34 directly behind the leading edge for maximizing cooling thereof during operation.

The suction sidewall 20 includes a row of diffusion film cooling first holes 42 extending therethrough in flow communication with the first passage 34 for discharging a portion of the spent impingement air therefrom. The first holes 42 are disposed through the suction sidewall 20 at a compound inclination angle A,B as illustrated in FIG. 4, with a quadrilateral cross section which forms a generally teardrop or diamond-shaped outlet 46 in the axially convex contour suction sidewall.

Each of the first holes 42 also includes a uniform, preferably cylindrical, inlet 44 extending through the suction sidewall from the first passage 34. The inlet 44 is followed in turn by the teardrop outlet 46 which diverges therefrom for increasing flow area to effect diffusion of the spent impingement air being discharged therethrough. As shown in FIG. 4, the cylindrical inlet 44 extends through a majority of the thickness of the suction sidewall 20, with the diffusion outlet 46 being relatively short in comparison thereto.

The teardrop outlets 46 illustrated in FIG. 4 include substantially straight sides or edges which are radially aligned along the airfoil span in the row of first holes 42. Each outlet 46 also includes two inclined sides at the top and bottom thereof which extend from the radial straight side toward the leading edge 22. The two inclined sides are joined together by an arcuate fourth side of the outlet along the convex contour of the suction sidewall.

The airfoil further includes another row of diffusion film cooling second holes 48 which extend through the suction sidewall 20 adjacent and parallel to the row of first holes 42. Like the first holes 42, the second holes 48 are disposed through the suction sidewall at a compound inclination angle A,B with a quadrilateral cross section forming a generally teardrop or diamond-shaped outlet 52 in the axially convex contour of the suction sidewall.

Each of the second holes 48, like the first holes 42, also includes a uniform and preferably cylindrical inlet 50 extending through a majority of the thickness of the suction sidewall 20 from the first passage 34. The inlet 50 is followed in turn by the teardrop outlet 52 which diverges therefrom with an increasing flow area for effecting diffusion of the spent impingement air being discharged therethrough.

Like the outlet 46, the teardrop outlet 52 includes a substantially straight side or edge aligned radially along the airfoil span in the second row of holes 48. Two inclined top and bottom sides of the second holes 48 extend from the straight first side toward the first row of holes 42 and the leading edge 22. The two inclined sides are joined together by an arcuate fourth side along the convex contour of the airfoil.

As shown in FIG. 4, the two rows of diffusion holes 42,48 are substantially identical to each other except in local configuration for complementing the chordally convex contour of the airfoil suction sidewall closely adjacent to the leading edge outside the first flow passage 34. The impingement air 32 is first discharged through the row of impingement holes 40 for effectively cooling the back side of the leading edge 22, and then is discharged through the two rows of diffusion holes 42,48. It is also noted that the first flow passage 34 may include a conventional row of film cooling holes 54 closely adjacent to the leading edge 22, as well as additional rows of film cooling holes if desired.

The preferred configuration of the diffusion holes 42,48 illustrated in FIG. 4 includes rectangular cross sections made by a corresponding electrical discharge machining (EDM) electrode 56. The electrode is sized with a suitably small rectangular distal end sized to generally match the circular cross section of the respective inlets 44,50 when joined. Typically, the inlets 44,50 may be initially drilled through the suction sidewall using any conventional process such as laser drilling, electrical discharge machining, or electrostream machining. The diffusion outlets may then be formed after the inlets. Or, the entire diffusion hole 42,48 may be formed in one operation.

The exemplary EDM electrode 56 increases in size from the small distal end thereof by diverging at about 10 degrees in the one vertical plane illustrated in FIG. 4, and about 20 degrees along the orthogonal horizontal plane illustrated. The 10 degree divergence in the vertical plane is from one side of the electrode, whereas the 20 degree divergence in the horizontal plane is symmetrical from both sides of the electrode, and split 10 degrees on each side. The proximal, or large end of the electrode also has a generally rectangular cross section.

The electrode may then be conventionally used for insertion from the suction side of the airfoil and aligned with the longitudinal centerline of the cylindrical inlets 42,48 to form the diffusion outlets thereof.

The formation of film cooling holes with diffusion outlets is conventional in general, but the configuration of the finally produced diffusion holes varies depending upon the curvature of the wall and the angular orientation of the electrode therethrough. The electrode 56 illustrated in FIG. 4 produces the specifically configured rows of diffusion holes 42,48 which enjoy improved cooperation along the suction side of the airfoil for improving the cooling effectiveness from the spent impingement air discharged therethrough.

More specifically, the row of second holes 48 is staggered with the row of first holes 42 along the airfoil span, with the respective holes in each row being generally aligned radially between the holes in the adjacent row.

The first and second holes 42,48 of the two rows preferably overlap each other along the airfoil span, and are chordally spaced apart, to provide a continuous line of film cooling air discharged therefrom along the airfoil suction sidewall 20 during operation. This configuration is evident in FIGS. 1 and 4 which ensures the formation of an improved film of cooling air from the combined configuration of the complementary diffusion hole rows.

As illustrated in FIG. 4, the first and second holes 42,44 preferably have substantially equal outward inclination span angles B along the airfoil span which is preferably greater than about 45 degrees. With this inclination, the respective outlets 46,52 of the holes are closer to the airfoil tip than the corresponding inlets 44,50 which are disposed radially below the outlets. In other words, the diffusion holes 42,48 are inclined radially outwardly through the suction sidewall.

In view of the changing convex contour of the suction sidewall outboard of the first flow passage 34, the first and second holes 42,48 preferably have different aft inclination chord angles A along the suction sidewall, which are also preferably greater than about 45 degrees. The respective outlets 46,52 are thusly closer to the airfoil trailing edge than their corresponding inlets 44,50 are.

Both sets of diffusion holes 42,48 are inclined through the suction sidewall into the first flow passage 34, with the first holes 42 being closer to the leading edge 22 than the second holes, and the second holes 48 being disposed closer to the bridge 38 than the first holes. In this way, the second holes 48 follow aft the first holes 42 in the direction downstream from the leading edge 22.

In the preferred embodiment illustrated in FIG. 4, the first and second holes 42,48 have inclination span angles B of about 48 or 49 degrees. The first holes 42 have inclined chord angles A of about 59 degrees. And, the second holes 48 have inclined chord angles A of about 46 degrees.

The resulting compound inclination angles A,B of the two rows of diffusion holes 42,48, along with the conical EDM electrode 56 create the unique teardrop or generally diamond-shaped outlet profiles along the axially convex suction sidewall. The teardrop outlets are staggered with each other between the two rows and provide continuity over the radial span of the airfoil which begins suitably below the mid-span or pitch section of the airfoil as illustrated in FIG. 1 and terminates just below the airfoil tip.

The specific configuration of the blade illustrated in FIG. 1 has been built and analyzed and enjoys substantial improvement in cooling in the region of the two rows of diffusion holes 42,48. In the preferred embodiment illustrated, the row of first holes 42 consists of twelve holes, staggered with the row of second holes 48 consisting of thirteen holes.

In the preferred embodiment illustrated in the several Figures, including in particular FIG. 4, the blade airfoil 12 preferably includes a thermal barrier coating 58 completely covering the external surfaces of the airfoil pressure and suction sidewalls 18,20, with the teardrop outlets 46,52 extending therethrough. The thermal barrier coating may have any conventional composition, and is typically a ceramic material providing enhanced thermal insulation for the exterior surface of the airfoil.

The thermal barrier coating is typically used with a suitable bond coat 60 which enhances bonding of the ceramic coating to the underlying metal substrate 62. The bond coat may have any conventional composition, such as platinum aluminide (PtAl) which additionally provides an environmental coating which enhances oxidation protection.

Advanced computational analysis of the performance of the two rows of diffusion holes 42,48 predicts a 50 percent increase in film cooling effectiveness just aft of the holes in the area of thermal distress experienced on the previous configuration of the airfoil having conventional round, non-diffusion film cooling holes. The increased film effectiveness of the diffusion holes illustrated in FIG. 4 results in a substantial reduction in temperature of the airfoil just aft of the diffusion holes in the area of previous blade distress.

For example, the area of blade distress uncovered in the high-life previous blades was near the airfoil pitch section just aft of the leading edge on the suction sidewall. The two rows of specifically configured teardrop diffusion holes 42,48 complement each other and provide enhanced film cooling further complementing the thermal barrier coating 58. The improved cooling of the airfoil and the thermal barrier coating thereon further increases the useful life of the blade.

Figure 5:
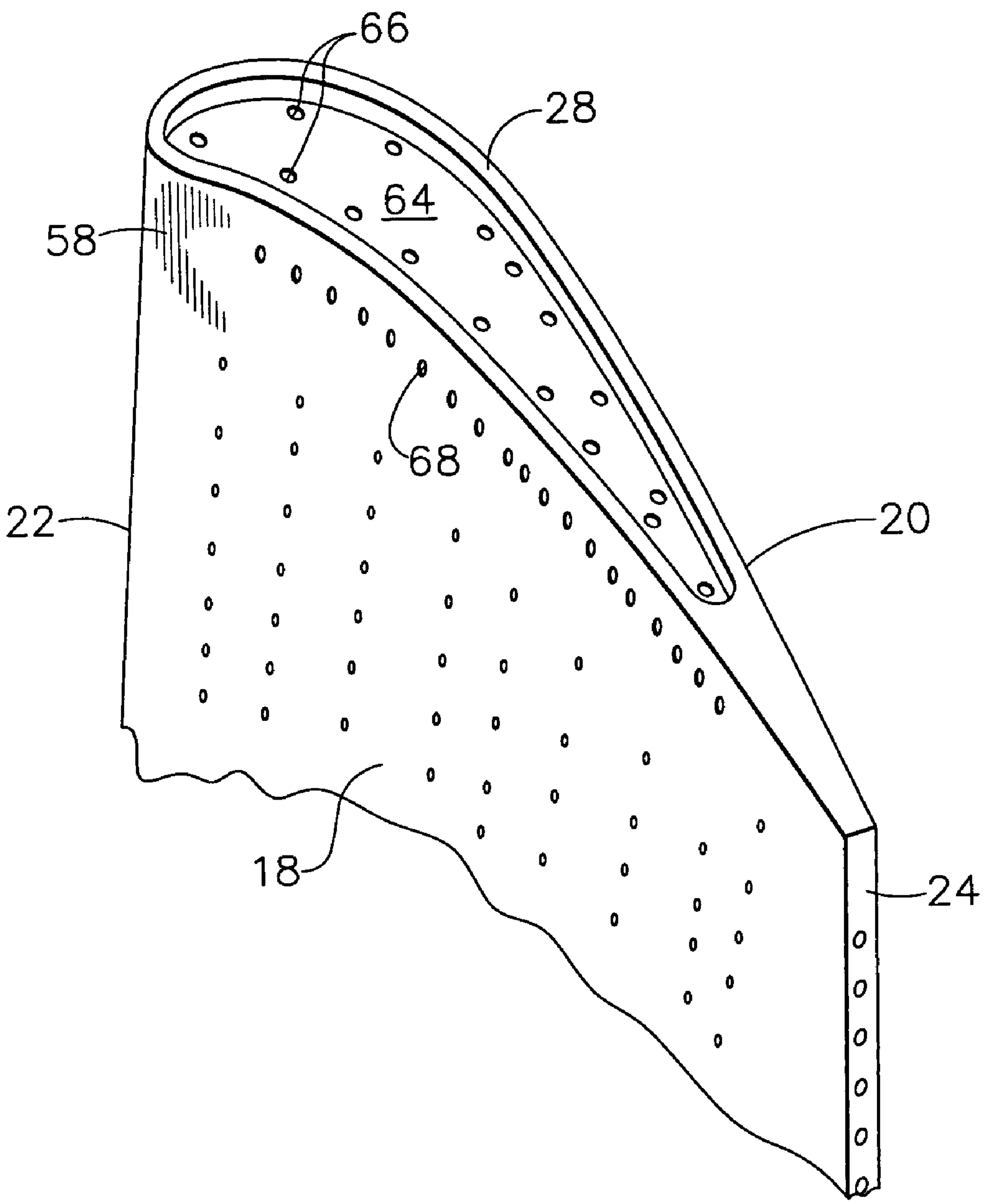
FIG. 5 is an enlarged isometric view of the tip of the blade illustrated in FIG. 1.

Another area of previous distress in the blade illustrated in FIG. 1 was the tip region of the airfoil. As best illustrated in FIG. 5, the airfoil tip 28 includes squealer ribs extending outwardly from the pressure and suction sidewalls 18,20 forming a recessed tip floor 64 therebetween. The resulting tip cavity ensures that the internal cooling circuit is contained and protected, with the squealer ribs of the tip 28 providing small extensions which cooperate with the surrounding turbine shroud to minimize the radial clearance or gap therewith.

The tip floor 64 illustrated in FIG. 5 includes rows of floor holes 66 along both the pressure and suction sidewalls 18,20 inboard of the squealer ribs 28. Cooperating with the floor holes 66 is an axial row of tip holes 68 located below the squealer rib 28 along the pressure sidewall 18.

In operation, the floor holes 66 and tip holes 68 discharge the air coolant from the internal cooling circuit for preferentially cooling the airfoil tip. The air discharged from the pressure side tip holes 68 flows up and over the pressure side squealer rib and over the tip cavity, and in turn over the suction side squealer rib. And, the air discharged from the floor holes 66 provides enhanced cooling along both pressure and suction side squealer ribs.

In the preferred embodiment illustrated in FIG. 5, the tip floor includes eight floor holes 66 suitably spread apart along the pressure sidewall 18; and seven floor holes 66 suitably spread apart along the suction sidewall 20. A common floor hole 66 is disposed midway between the opposite pressure and suction sidewalls at the aft end of the tip floor closest to the trailing edge.

Computational flow analysis predicts a substantial reduction in local tip temperatures of the airfoil tip due to the cooperation of the axial row of tip holes 68 and the distributed floor holes 66. This improvement in tip cooling performance is particularly remarkable and surprising since the axial row of tip holes 68 is a conventional feature previously found in a blade of this type commercially used in this country for many years. However that use cooperated with floor holes in the airfoil tip being substantially fewer in number than those illustrated in FIG. 5, and disposed primarily only along the airfoil pressure sidewall.

It is further noted that another conventional blade of the type illustrated in FIG. 5 was successfully used commercially in this country for many years, and had substantially the same sixteen-hole pattern illustrated in FIG. 5, but without the use of the axial row of tip holes 68. The new combination of the axial tip holes 68 and the illustrated floor holes provides a substantial reduction in tip temperature not previously obtained.

As indicated above, the various forms of internal cooling circuits, pressure and suction side film cooling, and tip cooling are generally conventional, but found in myriad configurations in conventional practice. The exemplary blade illustrated in the several Figures in most part utilizes conventional cooling features in an identical manner previously used in successful commercial use for many years in this country, including the various rows of representative film cooling holes shown in the figures.

However, the two rows of diffusion holes 42,48 uniquely provide a significant improvement in local cooling of the airfoil suction side, while the specific configuration of the tip holes illustrated in FIG. 5 enhances local cooling of the tip. The resulting rotor blade enjoys specifically tailored improvement in cooling in areas of thermal distress uncovered only after many, many years of accumulated service in actual operating engines. The improved blade is therefore available for retrofit in existing engines, as well as for use in new engines and will enjoy a commensurate increase in useful life thereof notwithstanding the harsh, high temperature operating environment in a modern gas turbine engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:

an airfoil integrally joined to a supporting dovetail;

said airfoil including opposite pressure and suction sidewalls extending chordally between opposite leading and trailing edges and in span from a root to a tip, an internal cooling circuit, and thermal barrier coating covering external surfaces of said airfoil pressure and suction sidewalls;

said cooling circuit including a first flow passage disposed directly behind said leading edge, followed in turn by a second flow passage separated therefrom by a bridge integrally joined to said pressure and suction sidewalls;

said bridge including a row of impingement apertures for discharging air from said second passage into said first passage in impingement behind said leading edge;

said suction sidewall including a row of diffusion film cooling first holes extending therethrough in flow communication with said first passage, and said first holes being disposed through said suction sidewall at a compound inclination angle with a quadrilateral cross section forming a generally teardrop shaped outlet in a convex contour of said suction sidewall, with said teardrop outlet extending through said thermal barrier coating;

said airfoil tip including squealer ribs extending outwardly from said pressure and suction sidewalls forming a recessed tip floor therebetween;

said tip floor including rows of floor holes along both said pressure and suction sidewalls inboard of said squealer ribs; and said pressure sidewall includes an axial row of tip holes disposed below said squealer rib thereat.

2. A blade according to claim 1 wherein said first holes each includes a uniform inlet extending through said suction sidewall from said first passage, followed in turn by said teardrop outlet diverging therefrom.

3. A blade according to claim 2 wherein said teardrop outlet includes a substantially straight side aligned along said airfoil span in said row of first holes, and two inclined sides extending therefrom toward said leading edge and joined together by an arcuate side along said convex contour.

4. A blade according to claim 3 further comprising a row of diffusion film cooling second holes extending through said suction sidewall adjacent to said row of first holes, and said second holes being disposed through said suction sidewall at a compound inclination angle with a quadrilateral cross section forming a generally teardrop shaped outlet in said convex contour of said suction sidewall.

5. A blade according to claim 4 wherein said second holes each includes a uniform inlet extending through said suction sidewall from said first passage, followed in turn by said teardrop outlet diverging therefrom.

6. A blade according to claim 5 wherein said teardrop outlet of said second holes includes a substantially straight side aligned along said airfoil span in said row of second holes, and two inclined sides extending therefrom toward said leading edge and joined together by an arcuate side along said convex contour.

7. A blade according to claim 6 wherein said row of second holes is staggered with said row of first holes along said airfoil span.

8. A blade according to claim 7 wherein said first and second holes overlap along said airfoil span to provide a continuous line of film cooling air discharged therefrom along said airfoil suction sidewall.

9. A blade according to claim 8 wherein said first and second holes have substantially equal outward inclination span angles along said airfoil span greater than about 45 degrees, with said outlets being closer to said tip than said corresponding inlets.

10. A blade according to claim 9 wherein:

said first and second holes have different inclination chord angles along said suction sidewall greater than about 45 degrees, with said outlets being closer to said trailing edge than said corresponding inlets;

said row of first holes consists of twelve holes; and said row of second holes consists of thirteen holes.

11. A turbine blade comprising:

an airfoil integrally joined to a supporting dovetail;

said airfoil including opposite pressure and suction sidewalls extending chordally between opposite leading and trailing edges and in span from a root to a tip, and having an internal cooling circuit;

said cooling circuit including a first flow passage disposed directly behind said leading edge, followed in turn by a second flow passage separated therefrom by a bridge integrally joined to said pressure and suction sidewalls;

said bridge including a row of impingement apertures for discharging air from said second passage into said first passage in impingement behind said leading edge; and said suction sidewall including a row of diffusion film cooling first holes extending therethrough in flow communication with said first passage, and said first holes being disposed through said suction sidewall at a compound inclination angle with a quadrilateral cross section forming a generally teardrop shaped outlet in a convex contour of said suction sidewall.

12. A blade accordingly to claim 11 wherein said first holes each includes a uniform inlet extending through said suction sidewall from said first passage, followed in turn by said teardrop outlet diverging therefrom.

13. A blade accordingly to claim 12 wherein said teardrop outlet includes a substantially straight side aligned along said airfoil span in said row of first holes, and two inclined sides extending therefrom toward said leading edge and joined together by an arcuate side along said convex contour.

14. A blade accordingly to claim 13 further comprising a row of diffusion film cooling second holes extending through said suction sidewall adjacent to said row of first holes, and said second holes being disposed through said suction sidewall at a compound inclination angle with a quadrilateral cross section forming a generally teardrop shaped outlet in said convex contour of said suction sidewall.

15. A blade accordingly to claim 14 wherein said second holes each includes a uniform inlet extending through said suction sidewall from said first passage, followed in turn by said teardrop outlet diverging therefrom.

16. A blade accordingly to claim 15 wherein said teardrop outlet of said second holes includes a substantially straight side aligned along said airfoil span in said row of second holes, and two inclined sides extending therefrom toward said leading edge and joined together by an arcuate side along said convex contour.

17. A blade accordingly to claim 16 wherein said row of second holes is staggered with said row of first holes along said airfoil span.

18. A blade accordingly to claim 17 wherein said first and second holes overlap along said airfoil span to provide a continuous line of film cooling air discharged therefrom along said airfoil suction sidewall.

19. A blade accordingly to claim 18 wherein said first and second holes have substantially equal outward inclination span angles along said airfoil span greater than about 45 degrees, with said outlets being closer to said tip than said corresponding inlets.

20. A blade accordingly to claim 19 wherein said first and second holes have different inclination chord angles along said suction sidewall greater than about 45 degrees, with said outlets being closer to said trailing edge than said corresponding inlets.

21. A blade accordingly to claim 20 wherein said first holes are disposed closer to said leading edge, and said second holes are disposed closer to said bridge.

22. A blade accordingly to claim 20 wherein:

said first and second holes have inclination span angles of about 48 degrees;

said first holes have inclination chord angles of about 59 degrees; and said second holes have inclination chord angles of about 46 degrees.

23. A blade accordingly to claim 22 wherein:

said row of first holes consists of twelve holes; and said row of second holes consists of thirteen holes.

24. A blade accordingly to claim 23 wherein said teardrop outlets of said first and second holes have rectangular cross sections diverging at about ten degrees in one plane, and at about 20 degrees along an orthogonal plane.

25. A blade accordingly to claim 20 further comprising thermal barrier coating covering external surfaces of said airfoil pressure and suction sidewalls, with said teardrop outlets extending therethrough.

26. A blade accordingly to claim 20 wherein:

said airfoil tip includes squealer ribs extending outwardly from said pressure and suction sidewalls forming a recessed tip floor therebetween;

said tip floor includes rows of floor holes along both said pressure and suction sidewalls inboard of said squealer ribs; and said pressure sidewall includes an axial row of tip holes disposed below said squealer rib thereat.

27. A blade accordingly to claim 26 wherein said tip floor includes eight floor holes along said pressure sidewall, seven floor holes along said suction sidewall, and a common floor hole midway therebetween at the aft end of said tip floor.

* * * * *